H. D. MOISE.
AIR SEAL FLUSHING APPARATUS.
APPLICATION FILED APR. 19, 1909. RENEWED JAN. 13, 1910.
965,531.
Patented July 26, 1910.
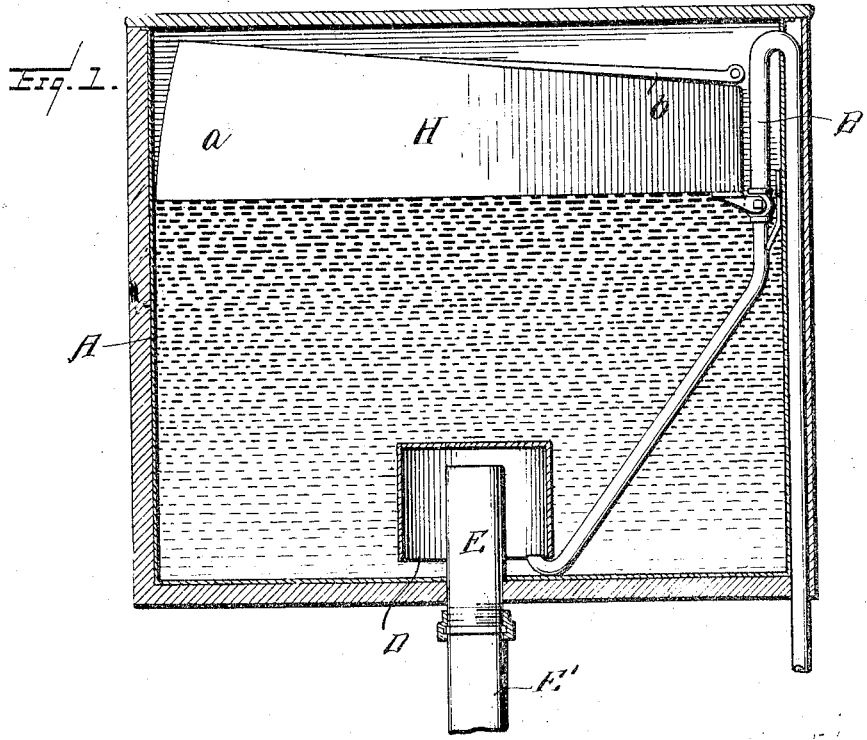
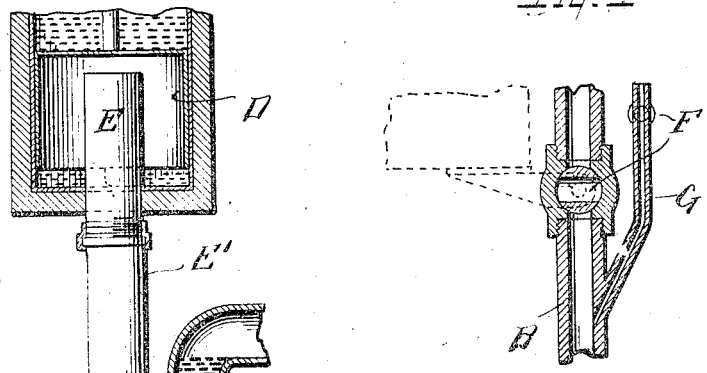

UNITED STATES PATENT OFFICE.

HARMON D. MOISE, OF SUMTER, SOUTH CAROLINA, ASSIGNOR TO THE VALVELESS FLUSH-TANK COMPANY, OF SUMTER, SOUTH CAROLINA.

AIR-SEAL FLUSHING APPARATUS.

965,531. Specification of Letters Patent. Patented July 26, 1910.

Application filed April 19, 1909, Serial No. 490,891. Renewed January 13, 1910. Serial No. 537,934.

*To all whom it may concern:*

Be it known that I, HARMON D. MOISE, a citizen of the United States, residing at Sumter, in the county of Sumter and State of South Carolina, have invented certain new and useful Improvements in Air-Seal Flushing Apparatus; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in flush tank apparatus and it has for its object the provision of means whereby valves controlling the outlet of the flush reservoir or tank are entirely dispensed with and the flow of liquid from the tank is automatically prevented by means of an air seal or trap.

To these ends and to such others as the invention may pertain, the same consists in the peculiar arrangement and in the novel combination and adaptation of parts, all as will be more fully hereinafter described, shown in the accompanying drawings and then specifically defined in the appended claims.

The invention is clearly illustrated in the accompanying drawings which form a part of this specification and in which:—

Figure 1 is a central vertical section taken through a flush tank apparatus, showing the tank, the float and its inlet and outlet connections. Fig. 2 is an enlarged detail edge view, partly in section, of the lower portion of the tank, showing the inclosed air bell and a portion of the siphon connected therewith, and Fig. 3 is an enlarged detail view of the inlet valve and an inlet pipe connected therewith.

Reference now being had to the details of the drawings by letter, A designates the flushing tank of ordinary construction and provided with the usual inlet pipe B which, in the present instance, is shown as interposed between the outer walls and lining of the tank, the pipe entering from the lower portion of the tank and extending to a point within the upper portion thereof and is turned downward within the tank and terminating at its lower end at a point beneath a bell or chamber D which is secured within the tank at a point adjacent to the bottom thereof. The pipe E, which constitutes the equivalent of the long end of the gooseneck siphon E′, is passed through the bottom of the tank and its open upper end terminates at a point within the upper portion of the bell D, the open lower end of said bell being spaced a short distance above the bottom of the tank. The siphon E′ may be of any of the ordinary well known forms of siphons, such as are commonly used in flushing apparatus. In the present instance, I have shown the ordinary circular form. F is the ordinary valve used in the inlet pipe for regulating the supply of water to the tank. This valve may be of any form of construction adapted to the purpose.

G designates an air inlet pipe communicating with the inlet pipe B at a point below the valve F, the upper end of said air inlet pipe G being open and extended to a point above the normal line of liquid within the tank. A valve is placed in this air inlet pipe to be set to regulate the amount of air. H is a float which, in the present instance, is shown as occupying practically the entire upper portion of the tank, the bottom line of said float being at the height of the liquid when the tank is charged, the end *a* of the float being adapted to be closed downward upon the liquid within the tank by means of the usual lever *b* and chain *d*.

From the foregoing description, the operation of the device will be readily understood. Liquid entering the inlet pipe B will enter beneath the bottom of the bell D below the level of the open end, or the short end E of the gooseneck siphon. The air inlet pipe G, it will be noted, permits the air to enter the inlet pipe B, the air thus entering mingling with the liquid within the pipe and being discharged with it beneath the open bottom of the bell D and, owing to the difference, the air will at once separate itself from the liquid by natural laws and will occupy the space within the upper portion of the bell and, continuing to increase in volume, will force the liquid as it enters the bell downward and out through the open space beneath the bell into the tank, this continuing until the liquid within the tank has reached its normal level.

It will be seen that the open end of the bell or short end of the siphon is thus provided with an effective air trap which will prevent the water from entering the siphon until the flushing operation. The operation of flushing the tank consists merely in forcing the end $a$ of the float downward in the surface of the liquid within the tank by means of the operating chain $d$, this downward pressure imparted by the float serving to force liquid from within the tank into the bell D where it enters the open upper end of the discharge pipe E, thus completing the siphon and discharging the water therethrough from the tank.

I have found from experiment that a determined quantity of air will so effect the operation of the filling of the tank as to have the result that the water, during the flushing operation, falls to a line a slight distance above the bottom line of the air trap bell and immediately begins to raise again, thus eliminating the gurgling sound heretofore experienced at that point of the flush. This results from the bell being so quickly charged with air as to cut off siphonic action before it would otherwise stop.

When the tank has been flushed, it sometimes occurs that the bell D may stick, or in other words the liquid may not all be emptied into the tank therefrom. This, of course, would prevent the formation of a proper air trap within the bell and the float, being below the horizontal position and the supply valve for liquid being open, a constant flow and consequent waste would occur, but in my improvement the liquid being supplied to the tank containing therein a certain quantity of air supplied through the air supply pipe G, will at once again fill the upper portion of the bell and discharge the liquid contained therein into the tank. The liquid that is first received within the bell upon the termination of the flushing of the tank, when the bell has not been cleared of liquid by the flush, immediately forces a portion of the latter liquid through the discharge pipe E, thus furnishing an ample afterflow, with the resealing of the bell, after which a sufficient amount of air will enter the bell to force the liquid within the same below the upper end of the discharge pipe, when the open end of the pipe will again become air bound and no further liquid can escape therethrough until the tank is again flushed in the usual way.

Having thus described my invention, what I claim to be new and desire to secure by Letters Patent is:—

1. A flush tank apparatus comprising a tank, a bell or chamber inclosed within the tank, an outlet pipe having its open end within the upper portion of the bell, an inlet pipe terminating at a point beneath the open bottom of the bell, and an air inlet connection with the inlet pipe.

2. In a flush tank apparatus of the character described, a tank, a float within the tank, means for depressing the float, a bell within the lower portion of the tank, a water trap the upper end of which is passed through the bottom of the tank and having its open upper end disposed within the upper portion of the bell, an inlet pipe adapted to supply liquid beneath the open bottom of the bell at a point below the open end of the discharge pipe, and means for supplying air in the bell.

3. In a flush tank apparatus, in combination with a tank, a bell disposed within the tank and having an open bottom, an inlet pipe communicating with the open lower end of the bell, an outlet pipe, the open end of which is disposed within the upper portion of the bell above the lower edge of the bell, and connections whereby air is supplied to the bell.

4. A flush tank apparatus comprising a tank, a discharge pipe communicating therewith, the upper end of the discharge pipe extending upward into the tank and the lower end being returned upward to form a liquid trap, a bell positioned over the upper end of the discharge pipe and inclosing it and leaving space below and within the bell for the passage of the liquid and the retention of the air trapped therein, a liquid supply pipe or pipes whereof the delivery end is positioned under the bell, and means for causing air to be supplied to said bell and be held trapped therein to prevent the discharge of the liquid from the tank.

5. A flush tank apparatus comprising a tank, a float within the latter, means for depressing the float, a bell within the lower portion of the tank, an outlet pipe having its open end within the upper portion of the bell, an inlet pipe terminating at a point beneath the open bottom of the bell, and a valved air jet connection operated by the liquid passing through the inlet supply pipe.

6. A flush tank apparatus comprising a tank, a discharge pipe communicating therewith, the upper end of the discharge pipe extending into the tank and the lower end being returned upward to form a liquid trap, a bell positioned over the upper end of the discharge pipe and inclosing it and leaving a space below and within the bell for the passage of the liquid and the retention of the air trapped therein, a pipe for supplying liquid to the tank, and means for supplying air to said space additional to the air trapped by the rise and fall of the liquid in the tank.

In testimony whereof I hereunto affix my signature in the presence of two witnesses.

HARMON D. MOISE.

Witnesses:
    ADA K. FOWLER,
    FRANKLIN H. HOUGH.